United States Patent Office.

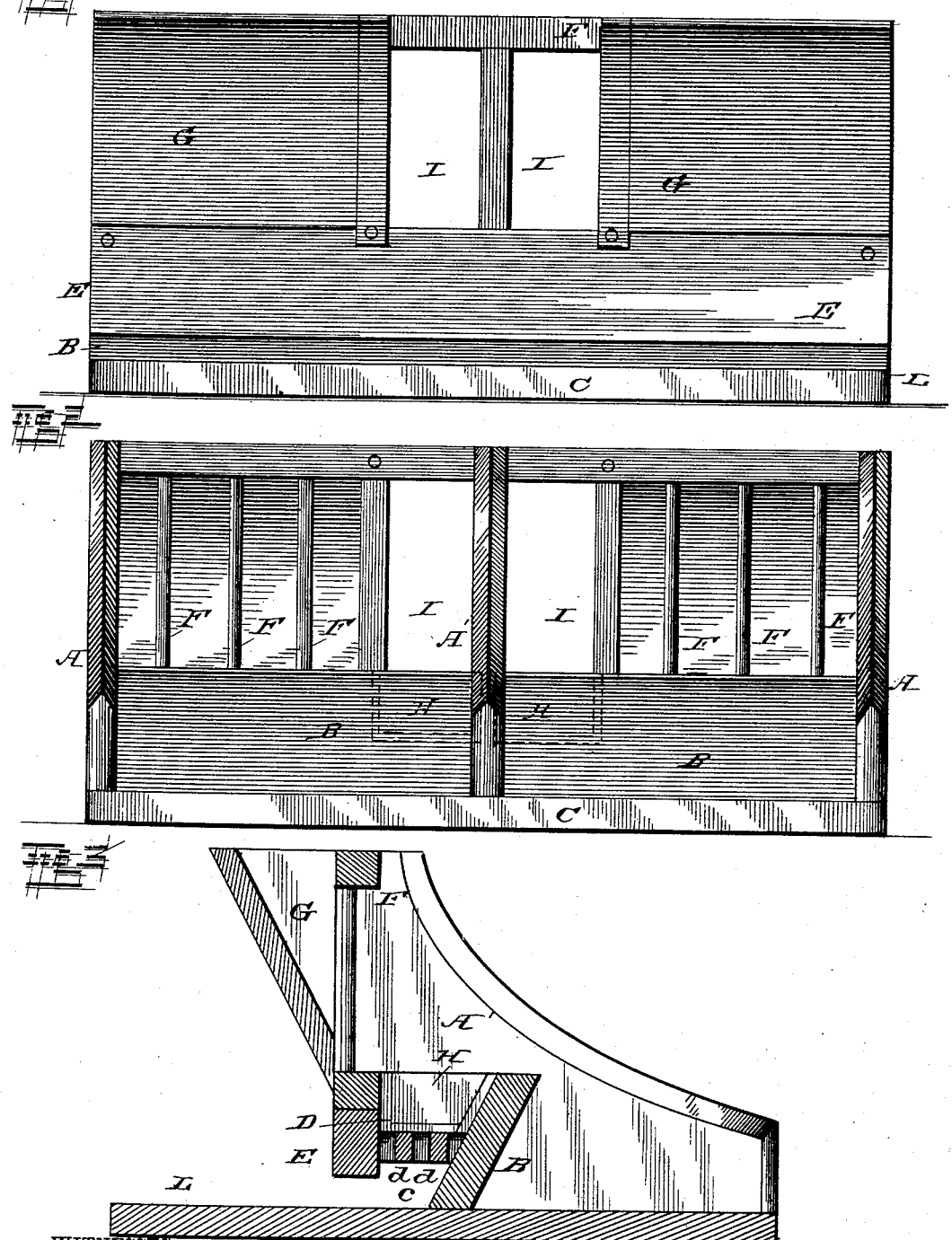

JOHN E. ROACH, OF BATESVILLE, OHIO.

SAFETY STOCK-FEEDER.

SPECIFICATION forming part of Letters Patent No. 327,110, dated September 29, 1885.

Application filed August 27, 1884. (No model.)

*To all whom it may concern:*

Be it known that I, JOHN E. ROACH, a citizen of the United States, residing at Batesville, in the county of Noble and State of Ohio, have invented certain new and useful Improvements in Safety Stock-Feeders, of which the following is a specification, reference being had therein to the accompanying drawings.

My invention relates to improvements in portable safety-stalls or feeding devices, which are usually constructed in pairs, to enable the feeding of stock without the attendant entering the stalls, as great danger is often incurred by coming in contact with vicious animals while feeding the same, all of which is avoided by my contrivance, by which also waste is prevented; and to this end the invention consists in the construction and arrangement of the several parts, as will be hereinafter more fully described, and pointed out in the claims appended.

In the accompanying drawings, to which reference is had, and which fully illustrate my invention, Figure 1 is a front view of my device, showing the feed-openings, seed-receiver, and feed-walk. Fig. 2 is a rear view of the pair of stalls, and Fig. 3 is a sectional view of the same.

A A represent the ends, and A' the partition-wall of my portable safety-stalls, which are arranged in pairs; and B is the breast-board secured to the walls A A' A. These several parts are attached to the false floor C, which rests on the floor of the building used as a stable, and my device can be used in the open air or in any room of a building without other appurtenances. The false floor C, to which the breast-board B and the ends and partition-wall are attached, extends some distance in front of the feeding device to form the seed-receiver and the approach to the feeding-place or the feed-walk L.

Immediately in front of the breast-board is the catch-box D, which extends the whole width of the stall, and has an open bottom formed of slats $d$, arranged on edge parallel with each other and with the breast-board and front wall, E, and closely enough together to prevent the passage of hay, but allowing seed to pass through and fall into the seed-receptacle $c$ on the floor C in front of the breast-board, where it can be collected. The front wall, E, is attached to the sides A and partition A', and is elevated slightly above the floor at bottom, thus forming the seed-receptacle, but permitting the seed to be removed from under the catch-boxes.

A rail, F, extends across the top of the end and partition walls, and serves to strengthen the device and to support the racks or hay-receivers G, which rise from the front wall, E, having their bottoms just on a level with the catch-boxes, so that the hay stored in the racks, as it is drawn out by the animal, will fall into the catch-box and none be wasted. The receivers G have solid sloping backs and vertical rack-bars in front, and are open at the top at a height of about seven feet from the ground, and are also open at the outer ends, so that hay can be readily introduced therein from the feed-walk L.

In the catch-box, at each side of the partition-wall A', are subdivisions forming boxes H, for holding grain, water, or mixed food, and these are approached by corresponding openings, I, just above them at the ends of the hay racks or receivers. These openings for the introduction of food and water are each two feet wide by three feet high, and open from the feed-walk to the catch-boxes.

A vicious horse or other animal may thus be fed or watered by my device with perfect safety even by a child, and no waste can occur in feeding hay, for as the animal draws a bunch of hay from the receiver the seed and blades will fall into the catch-box, the latter being retained therein by the slats $d$, and the former will pass through to the seed-receiver $c$ below the catch-box and be saved.

My device can be used as a fixture in barns, stables, &c., where, if desired, the false floor may be dispensed with and the ends and partition-walls and breast-board be secured directly to the stable-floor; but it is particularly adapted to use in the open air temporarily, or in large barns or buildings, where many animals are fed, in which latter case two sets of stalls can be arranged with their feed-walks side by side.

It is simpler and cheaper to construct my stalls in pairs, as shown; but it is obvious that one alone can be used, or a number may be connected when permanently constructed.

Having thus fully described my invention, what I claim therein as new, and desire to secure by Letters Patent, is—

1. A portable safety-stall consisting of the floor C, the walls A A', the breast-board B, the catch-box D, the feed or water box H, the hay rack or receiver G, and having the openings I in front to introduce food and water without entering the stall, all constructed substantially as and for the purposes specified.

2. A portable safety-stall for horses and cattle, consisting of the receiver G, the catch-box D, having an open bottom formed by the slats d, the seed-receiver c, the feed or water box H, the feed-walk L, and having the openings I, for the introduction of food, all substantially as shown and described.

In testimony whereof I affix my signature in presence of two witnesses.

JOHN E. ROACH.

Witnesses:
S. T. VANMETER,
W. E. FINLEY.